No. 797,617. PATENTED AUG. 22, 1905.
O. J. & C. A. SEFTON.
CULTIVATOR.
APPLICATION FILED MAY 26, 1904.
2 SHEETS—SHEET 1.
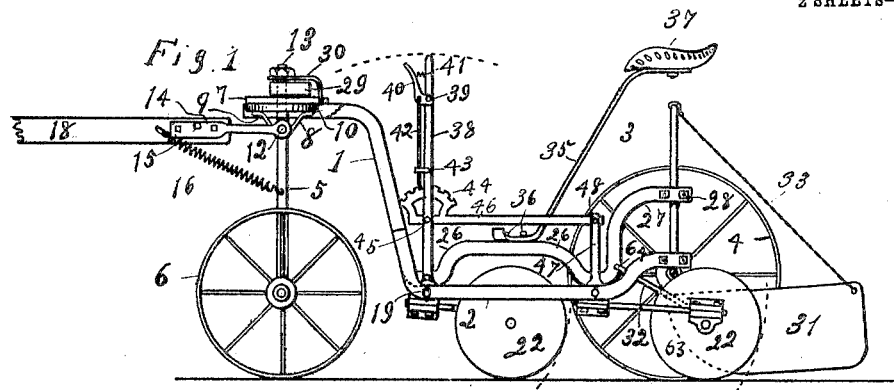
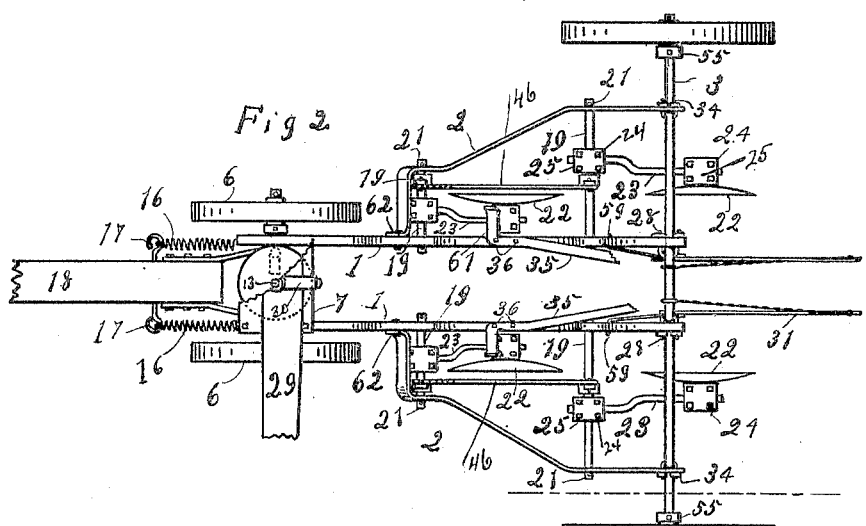
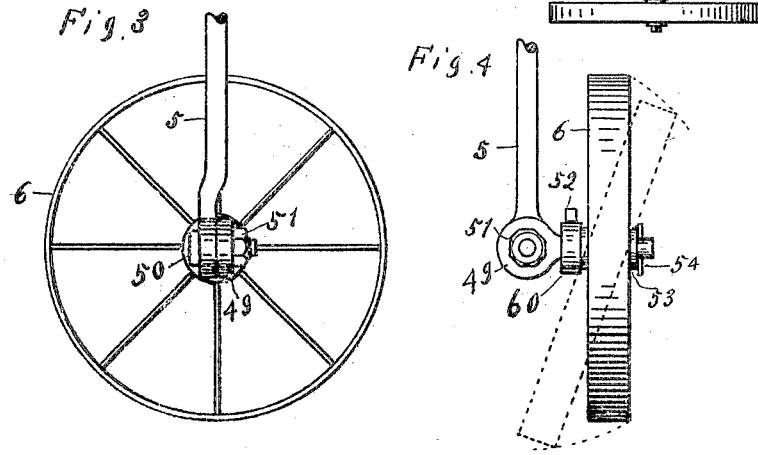
Witnesses:
Isaac J. Epperson
F. A. Reed
Inventors
Orlando J. Sefton
Charles A. Sefton
By W. Stewart Brown Attorney

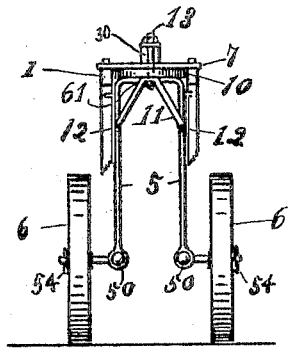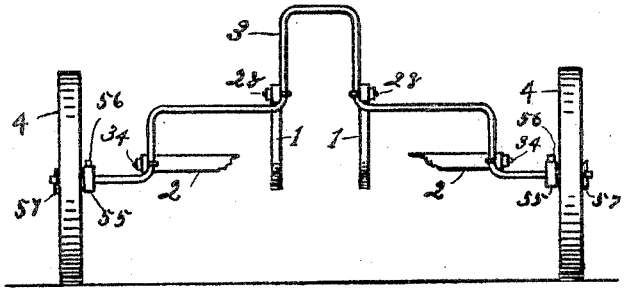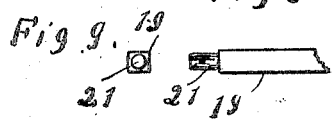

UNITED STATES PATENT OFFICE.

ORLANDO J. SEFTON AND CHARLES A. SEFTON, OF WICHITA, KANSAS.

CULTIVATOR.

No. 797,617.      Specification of Letters Patent.      Patented Aug. 22, 1905.

Application filed May 26, 1904. Serial No. 209,934.

*To all whom it may concern:*

Be it known that we, ORLANDO J. SEFTON and CHARLES A. SEFTON, of Wichita, in the county of Sedgwick and State of Kansas, have invented certain new and useful Improvements in Cultivators; and we do hereby declare the following to be a full, clear, and exact description of the invention, such as will enable others skilled in the art to which it appertains to make and use the same.

Our invention relates to improvements in cultivators, and is of that class which uses disks instead of shovels and is especially adapted to cultivate large corn as well as small listed corn.

Heretofore cultivators adapted to small listed corn did not work well in second and third plowing.

The improvement consists of the novel features and the peculiar construction and combination of parts, which will be hereinafter more fully described and claimed and which are shown in the annexed drawings, in which—

Figure 1 is a side elevation of our cultivator, one of the rear wheels being removed. Fig. 2 is a plan view of the machine with portions broken away to more fully illustrate; Fig. 3, side view of front truck-wheel, showing the method of attaching the axle thereto; Fig. 4, rear view of front truck-wheel, showing the adjustment of the said axle; Fig. 5, a front view of the front truck; Fig. 6, a rear view of the rear truck; Fig. 7, the arm connecting the disk to the cultivator; Fig. 8, a section of a square shaft transversely positioned in the frame of the machine; Fig. 9, an end view of the journal on the square shaft 8.

Similar figures indicate corresponding parts throughout.

1 indicates a pair of iron bars bent and arched as seen in Fig. 1, the front ends thereof being higher than the body portion and riveted to a rectangular plate of iron 7.

5 is an arched frame, Fig. 4, preferably made of iron, the free ends thereof having adjustably affixed thereto by bolt 50 axles 49, said axles being of the form shown and are provided with collars 60, which are secured on said axles by set-screw 52. Wheels 6 are placed on said axles, a washer 53, placed next to said wheel, and linchpins 54 to hold the wheel thereon. A disk 10, having a round opening in the center thereof, is positioned on the top of the arched truck-frame 5, which frame has an opening 61 therein. An A-shaped brace 11 is provided, the free end thereof being secured to the frame by rivets 12 and the top portion of the brace having a hole therein to receive the bolt 13. On either side of the frame 5, Fig. 1, are braces 8, their free ends being securely riveted to the disk 10, the central portion of said brace having round openings to receive pivots 12, Fig. 1, which secure the braces to the axle 5. A tongue 18 has affixed thereto rods 14 by bolts 15, the free ends having openings to receive the pivots 12, which allows the free end of the tongue 18 to swing up and down, which is an important feature in crossing over ditches and ridges. Spiral springs 16 are attached to the tongue 18 by means of eyebolts 17, which are screwed into the tongue, the other ends of said springs being pivotally attached to the frame 5. It will be seen said springs will allow the tongue 18 to move freely up and down and also help support the frame 5 in crossing over an obstruction.

A rear axle 3, Fig. 6, of the form shown is provided with collars 55, held in the proper position with set-screws 56. Wheels 4 are kept on the axle with pins 57. Bars of iron 1, bent and arched in the form shown in Fig. 1, are spaced parallel about twelve inches apart. The front ends are securely riveted to a rectangular plate of iron 7, having a hole in the center thereof which is to receive the pin 13. It will be seen this plate 7 and the disk 10 constitute a fifth wheel, which will allow the front wheels of our plow to turn in any direction. An evener 29 is placed on top of the rectangular plate 7, through which the pin 13 passes, the top end of the pin 13 having a supporting-brace 30 extending back and down and secured to the rear side of plate 7. The rear ends of the bars 1 have upward bends 27 and are slidably attached to the rear axle by means of U-shaped bolts 28, having nuts thereon. Said bolts are passed over the axle and through holes in the bars 1, by which means the axle and the bars can be adjustably clamped together and the entire rear portion of the machine can be raised and lowered on the rear axle. Auxiliary bars 2 are bent in the form shown in Fig. 2 and are rigidly attached to bars 1 by means of rivets 62, the other ends thereof being adjustably attached to the rear axle by means of U-bolts 34. Rock-shafts 19, having on either end thereof journals 21, are transversely pivoted between bars 1 and 2, Fig. 2. On the rear bars are vertical standards 47. The lower ends of said standards are provided with quadrangular openings therein to receive the squared portion of the rock-shaft 19, the other ends having round openings therein. Levers 38 have their lower ends attached to the front rock-shafts 19, the same as standard 47, said levers having thumb-latches 40 pivotally secured thereto by rivets 39. Pendent from said latches are rods 42, passing through loops 43. A spiral spring 41 is positioned between lever 38 and thumb-latch 40, which will insure the pendent-rods 42 engagement with the segmental racks 44, said racks being attached to bars 46. One end of each of said bars is pivotally connected to a lever 38 with rivet 45, the other end to a vertical standard 47 with rivet 48. Clamps 25 are affixed to the square bars 19 by the usual means—in the present instance by a parted box having a square transverse recess in the lower half to receive bars 19 and a longitudinal round opening in the top half to receive the ends of the rods 23, said boxes being clamped together with bolts 24, by which means the box can be transversely adjusted on the shaft 19 to any position desired. The rear end of the shafts are adjustably clamped between parted boxes 24, Fig. 2, the lower portion of each of these boxes having a round opening therein, in which is placed a round pintle 63, which makes an axle for the disks 22. It will be seen the arches 26 in bars 1, Fig. 1, will permit the disks 22 to move laterally under bars 1. To the top edges of the arches 26 are secured by the cap-screws 36 the ends of spring-bars 35, which ends 61 are bent laterally for the purpose of making a foot-rest for the driver, as clearly illustrated in Fig. 2, these springs 35 extending up and rearwardly, having positioned thereon a seat 37. When cultivating listed corn the first time, it is essential the two front wheels of the cultivator run in the ditch. This is largely accomplished by an adjustment of the two front wheels, as indicated by the dotted lines, Fig. 4, which angle keeps the said wheels from climbing up the banks and leaving the ditch should the horses not straddle the row properly. When the ditches are well filled up and the corn is being layed by, the wheels can be straightened up by means of the adjustment of the axle as shown in Fig. 3. A sled 31, whose runners are of sheet-iron and have affixed to the front end rods 32, said rods having lateral bends on their free ends, which pass through round openings 64 in the vertical parts of the bars 1, is provided. A chain 33 is attached to the rear end of the sled and is carried up and affixed to the top of the arch of the axle 3.

Having thus explained the details of construction of our cultivator, we will now proceed to describe its operations generally. When the operator desires to force the disks into the ground, he pulls the lever 38 back, which lever being rigidly affixed to the squared portion of the bars 19 throws the disks 22 down, as indicated by the dotted lines, Fig. 1. The said disks can be reversed to throw the dirt either to or from the corn. The sled 31 can be suspended by the chain 33 to any height desired, allowing a portion of the loose dirt to roll in under the lower edges, and thus protecting the small corn from large clods, as hereinbefore explained.

It is obvious that the invention herein set forth is susceptible to many changes and modifications involving mechanical skill which may be made within the scope of the invention without departing from the spirit thereof. We do not, therefore, desire to be understood as limiting ourselves to the precise construction of the parts shown in the drawings.

Having thus described our invention, what we claim, and wish to secure by Letters Patent, is—

1. In a cultivator of the character described, a rectangular plate 7, a pair of arched bars 1, their front ends rigidly affixed to the rectangular plate, in combination with a pivoted truck 5, having adjustable wheels, and a tongue pivotally secured to said truck, spiral springs connecting said tongue and truck, substantially as described.

2. In a cultivator of the character described, a truck 5, and arched axle 3, a pair of arched bars 1, their front ends mounted on truck 5, their rear ends adjustably attached to arched axle 3, in combination with a pair of auxiliary bars 2, rigidly affixed to the arched bars 1, and divergently extending and adjustably attached to the rear axle, substantially as described.

3. In a cultivator of the character described, an axle 3 a pair of arched bars 1, having rigidly secured thereto auxiliary bars 2, divergently and rearwardly extending and adjustably affixed to axle 3, in combination with the rock-shafts transversely positioned between the arched bars 1, and the auxiliary bars 2, arms extending rearwardly from said rock-shafts and disks positioned on the free ends of said arms, and means for holding the rock-shafts in the desired position, substantially as described.

4. In a cultivator of the character described, a truck 5, arched bars 1, a rectangular plate rigidly secured to the front ends thereof, said plate pivotally secured to the truck 5, a tongue pivotally attached to said truck, spiral-springs connecting the tongue to said truck, axles adjustably affixed to said truck whereby the wheels 6, may be set at different angles, substantially as described.

5. In a cultivator of the character described, an arched frame 1, a rectangular plate rigidly secured to the front end thereof, said plate pivotally secured to a truck, a tongue pivotally attached to said truck, spiral springs connecting the tongue to said truck, axles adjustably affixed to said truck whereby the wheels may be set at definite angles, substantially as specified.

In testimony whereof we have signed this specification in the presence of two subscribing witnesses.

ORLANDO J. SEFTON.
CHARLES A. SEFTON.

Witnesses:
 ISAAC J. EPPERSON,
 F. A. REED.